(12) United States Patent
Obeidat

(10) Patent No.: US 10,846,337 B2
(45) Date of Patent: Nov. 24, 2020

(54) METHOD AND APPARATUS FOR ONLINE ORDERING VIA A HYBRID DATABASE IMPLEMENTATION FOR QUICK DATA RETRIEVAL

(71) Applicant: PizzaLoci, Inc., Austin, TX (US)

(72) Inventor: Fadi Obeidat, Austin, TX (US)

(73) Assignee: PIZZALOCI, INC., Austin, TX (US)

( * ) Notice: Subject to any disclaimer, the term of this patent is extended or adjusted under 35 U.S.C. 154(b) by 458 days.

(21) Appl. No.: 15/881,510

(22) Filed: Jan. 26, 2018

(65) Prior Publication Data

US 2018/0225781 A1 Aug. 9, 2018

Related U.S. Application Data

(60) Provisional application No. 62/454,800, filed on Feb. 5, 2017, provisional application No. 62/454,801, filed on Feb. 5, 2017.

(51) Int. Cl.
| | | |
|---|---|---|
| *G06F 16/00* | (2019.01) | |
| *G06F 16/90* | (2019.01) | |
| *G06Q 30/06* | (2012.01) | |
| *G06Q 10/08* | (2012.01) | |

(52) U.S. Cl.
CPC ......... *G06F 16/90* (2019.01); *G06Q 30/0625* (2013.01); *G06Q 30/0633* (2013.01); *G06Q 30/0641* (2013.01); *G06Q 10/087* (2013.01)

(58) Field of Classification Search
CPC .................................. G06Q 30/0601–0645
See application file for complete search history.

(56) References Cited

U.S. PATENT DOCUMENTS

| | | | | |
|---|---|---|---|---|
| 2016/0171584 A1* | 6/2016 | Cao | ................ | G06Q 30/0282 705/26.62 |
| 2016/0358235 A1* | 12/2016 | De Langis | ......... | G06Q 30/0605 |
| 2017/0236196 A1* | 8/2017 | Isaacson | ................ | G06Q 20/12 705/14.51 |

FOREIGN PATENT DOCUMENTS

WO  WO-0042547 A2 *  7/2000  ............. G06Q 30/06

OTHER PUBLICATIONS

Trappey, Amy, 'Global content management services for product providers and purchasers', 2004, Science Direct: Computers in Industry 53, pp. 39-58 (Year: 2004).*

(Continued)

*Primary Examiner* — William J Allen
*Assistant Examiner* — Maria S. P. Heath
(74) *Attorney, Agent, or Firm* — Perkins Coie LLP; Michael A. Glenn

(57) ABSTRACT

A food order is placed by a purchaser at a client prior to selecting the vendor. A server receives the order along with the purchaser information. The server matches the items with available vendors that offer the selected food order. The server sends a document to the client, including a list of vendors matching the order, along with other details that are specific to each vendor. The client receives the document. In response to selection of the vendor, the client sends the server a request to proceed. Upon receiving a finalized order, the server sends a checkout page to the client to finish the order. The client sends information needed to finish the order. The server receives the requested information and generates the order.

24 Claims, 10 Drawing Sheets

(56) References Cited

OTHER PUBLICATIONS

Uber Eats, Uber Technologies, Inc. [online], Discover restaurants that deliver near you, [retrieved on Sep. 25, 2018], Retrieved from: <https://www.ubereats.com/en-US/>, 2018, 3 pages.

* cited by examiner

METHOD AND APPARATUS FOR ONLINE ORDERING VIA A HYBRID DATABASE IMPLEMENTATION FOR QUICK DATA RETRIEVAL

CROSS REFERENCE TO RELATED APPLICATIONS

This application claims priority to U.S. provisional patent application Ser. No. 62/454,800, filed Feb. 5, 2017 and U.S. provisional patent application Ser. No. 62/454,801, filed Feb. 5, 2017, each of which is incorporated herein in its entirety by this reference thereto.

FIELD

The invention relates to communications networks. More particularly, the invention relates to dynamic search using a predefined index.

BACKGROUND

Many Web servers have been developed forming platforms through which vendors can advertise and sell products. The food industry has been using such platforms to advertise and sell menu items that are handed over to a purchaser via a delivery service or at the vendor's store (pickup or dine-in) (see FIG. 1, which shows an order system similar to Papa John's pizza order system).

Many services provide an access to multiple vendors (see FIG. 2, which shows an order system similar to the Uber Eats order system) where a user, who is a potential purchaser, can browse through vendors, select a vendor, browse through the menu, and then select and order items from the selected vendor menu (204).

A server computer system may provide an electronic version of a list of vendors in a specific geographical area. A user, who is a potential purchaser, may browse through the vendors using a browser to select a potential vendor. Once selected, the server computer system may provide an electronic version of the menu corresponding to the selected vendor that lists items available by that vendor via online ordering. Throughout the process, the server computer system may update the user with information regarding the order, such as cost and delivery/pickup time. When the user has completed selecting the items to be purchased, the server computer system then prompts the user for information to complete the ordering of the items. The information may include, for example, the purchaser's name, contact information, and billing information. The server computer system then typically confirms the order by sending a confirming Web page to the client computer system and schedules the order of the items.

Although this online ordering model is very flexible and intuitive, such model can be problematic when considering ordering certain items, e.g. pizza, for at least the following reasons:

1) The user, who is a potential purchaser, is forced to select the vendor first, via the vendor dedicated website (101) or via a third-party website that supports multiple vendors (201). After considering a potential vendor, the user must explore the selected vendor's menu (102/202), and then can select the desired item type (104/204). In such scenario, the user cannot determine certain order details that might impact his decision of selecting a vendor to proceed with prior to selecting the vendor first. Order details that may impact the user's decision can include price, delivery cost, delivery/pickup time, distance, supported payment method, etc. To explore these vendor-specific order details (vendor-order-signature) across other vendors, the user has to step back (103.b/203.b), select another vendor (101/201), explore the new menu (102/202), select the desired item (104/204), and so on. The overhead of exploring the order details, e.g. price, delivery cost, delivery/pickup time, distance, and payment method that is specific to every single vendor by iterating through the order loop (103.b, 101, 102, 103; 203.b, 201, 202, 203) can take much more effort than the overhead of checking out and placing the order itself. This overhead makes the online food ordering cumbersome.

2) Each time the user explores a new vendor, the user must browse through the new vendor's menu (102/202), which may possibly have a different organization, to locate the desired item type adding more complexity to the searching process. For example, a cheese pizza might be listed as item #1 in vendor-X, while in vendor-Y it might be listed as item #7.

3) In some cases, it is also possible that, when the user is exploring a new vendor, the new vendor may not have the desired item available on the menu which, in turn, wastes the user's time (103.b/203.b).

4) The user may not be aware of other available vendors that can fulfill the desired item which, in turn, limits the choices available for the user, e.g. a vendor that serves pizza and other types of food and that is not as well-advertised as a pizza vendor where a purchaser is initially interested to buying a pizza.

5) When delivery/pickup time is a critical factor, for example, during rush hours, certain vendors might be overbooked, causing a delivery/pickup delay. In such case, the user may choose to explore other vendors looking for a better delivery/pickup time (103.b/203.b). This may lead to uncertainty in the process of vendor selection in addition to the overhead spent to explore different vendors.

6) Similarly, this model makes it complicated to explore discounts across multiple vendors.

Even though such model allows the potential food purchaser to explore multiple vendors, it has a downside in that it requires multiple iterations to be performed sequentially and manually by the user (103.b/203.b).

It would be desirable to minimize the overhead and simplify the process of, and the decisions involved in, online food ordering.

SUMMARY

Embodiments of the invention provide a method and apparatus for ordering food from a predefined unified list of items (Gateway menu) in a client/server. For purpose of the discussion herein the Gateway menu is a unified menu that is common across multiple vendors. The herein disclosed predefined ordering system reduces the number of user's interactions needed to select and place an order. In one embodiment, the client system is preloaded with predefined items (Gateway menu), each of which is assigned with a unique identifier. The server system stores a database of vendor-specific information that includes basic information including, but not limited to, vendor name, address, phone number, Gateway menu items, detailed menu items, handing-over methods and details, e.g. delivery time area coverage, payment-method, etc. The user can select the desired items. The server system dynamically matches the order-signature (item(s)+address+handing-over method) for the user's desired items with vendors that fulfill the order-signature. The user can then select a vendor from among the various vendors who are able to provide the items in the order-signature to fulfill the order. Thereafter, the server system can create the order for the selected vendor, which can be delivered to the vendor via a portal system, email, or for example in the vendor's order entry system, which then proceeds to order fulfillment.

DRAWINGS

Figure 4:
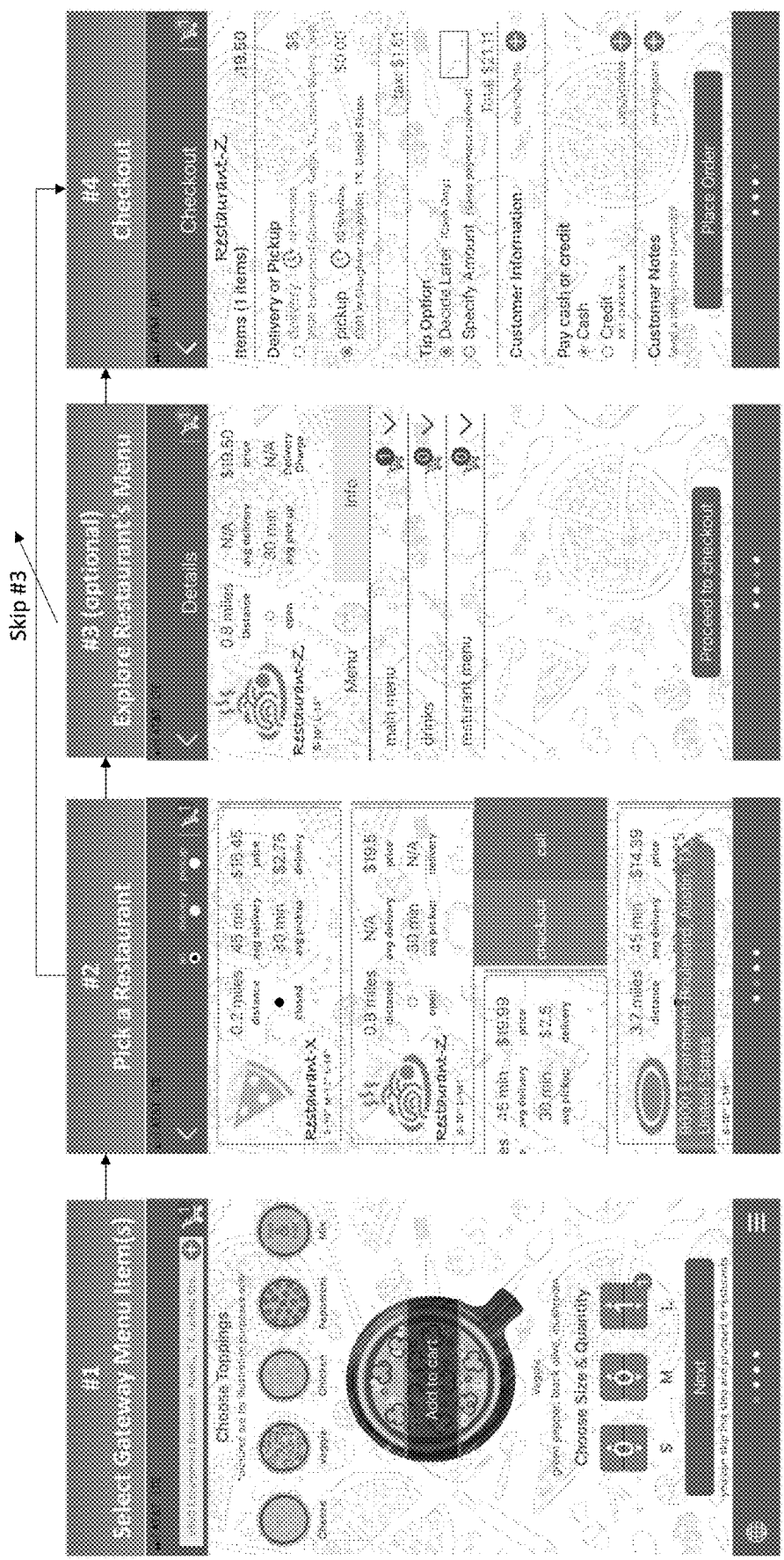
Figure 5:
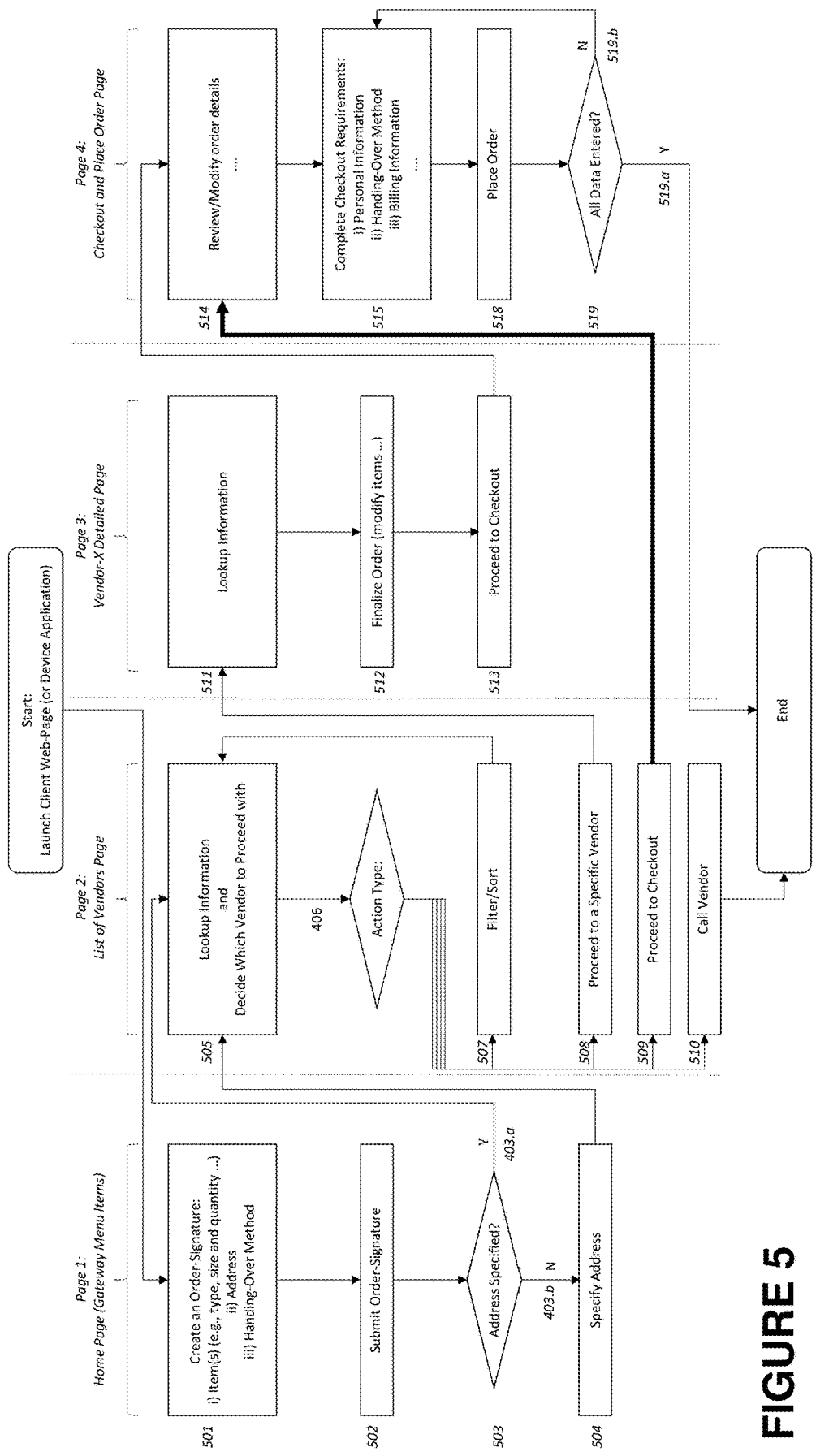
Figure 6:
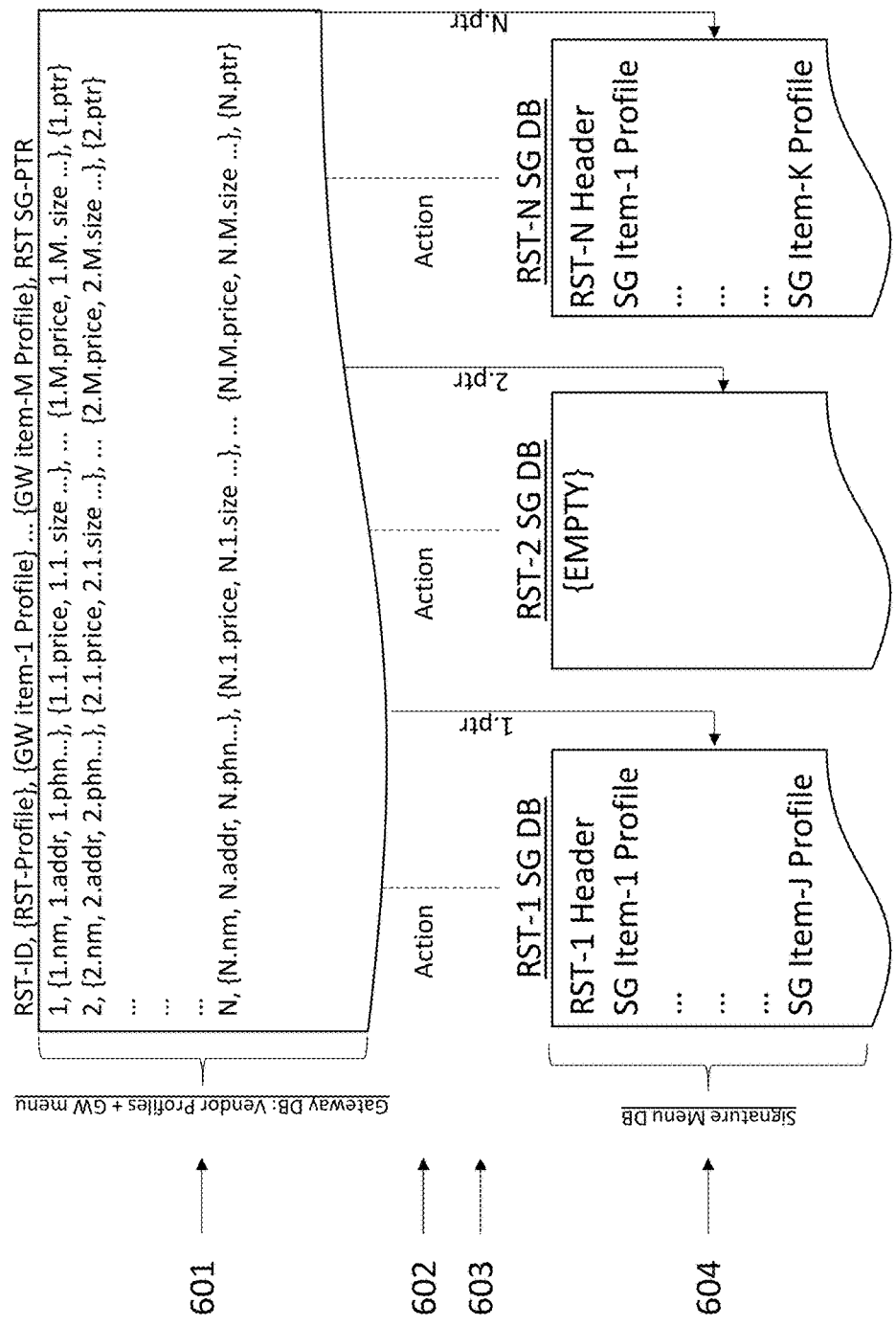
Figure 7:
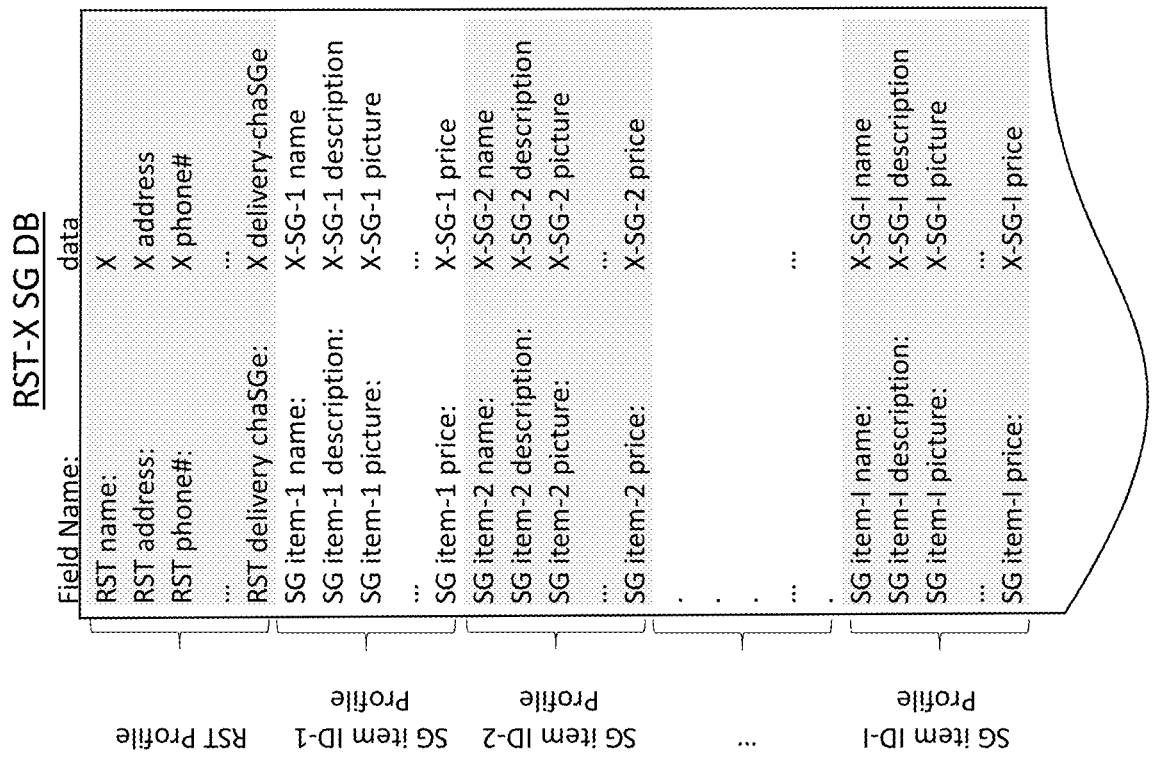
Figure 8:
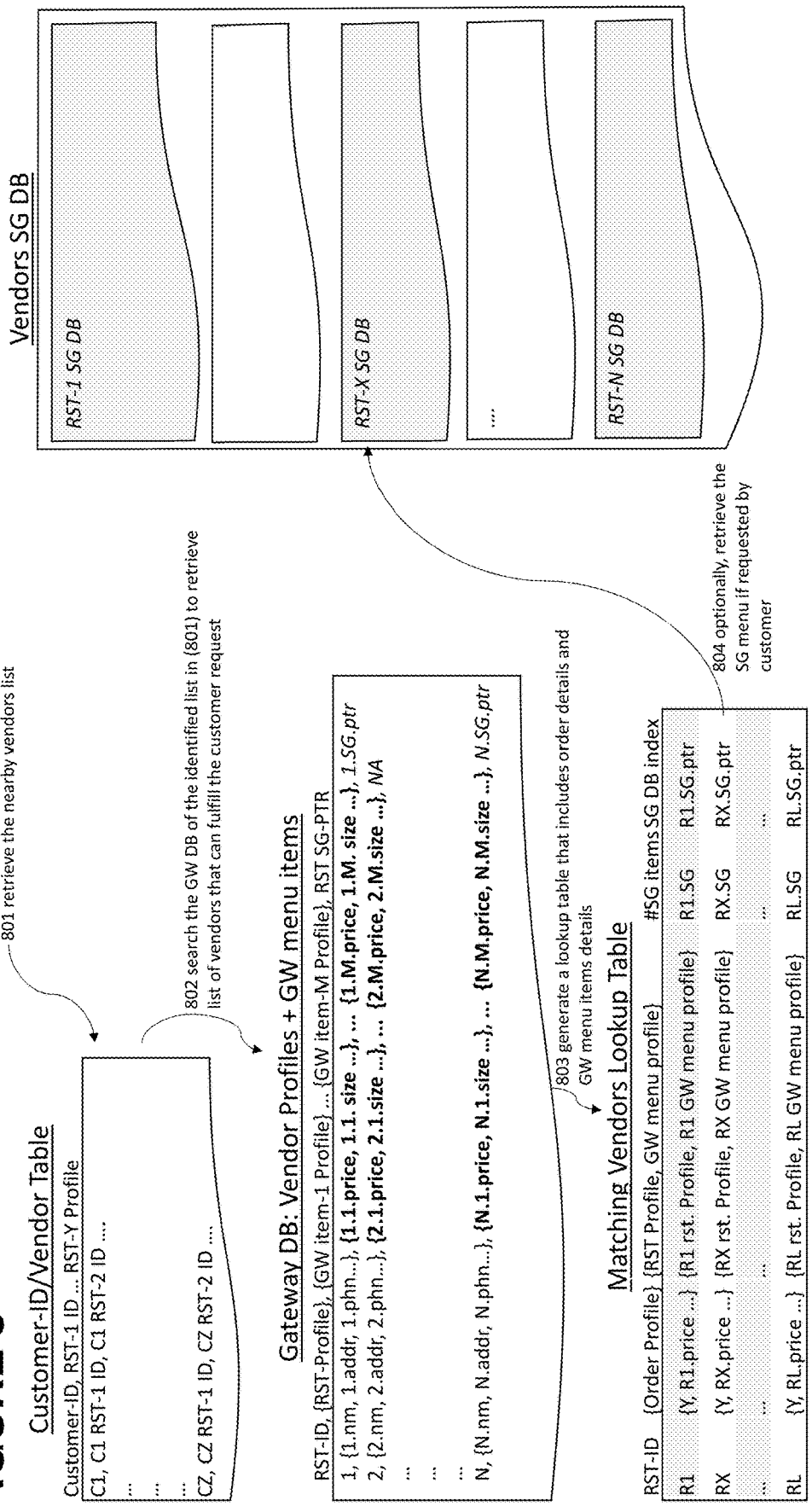
Figure 9:
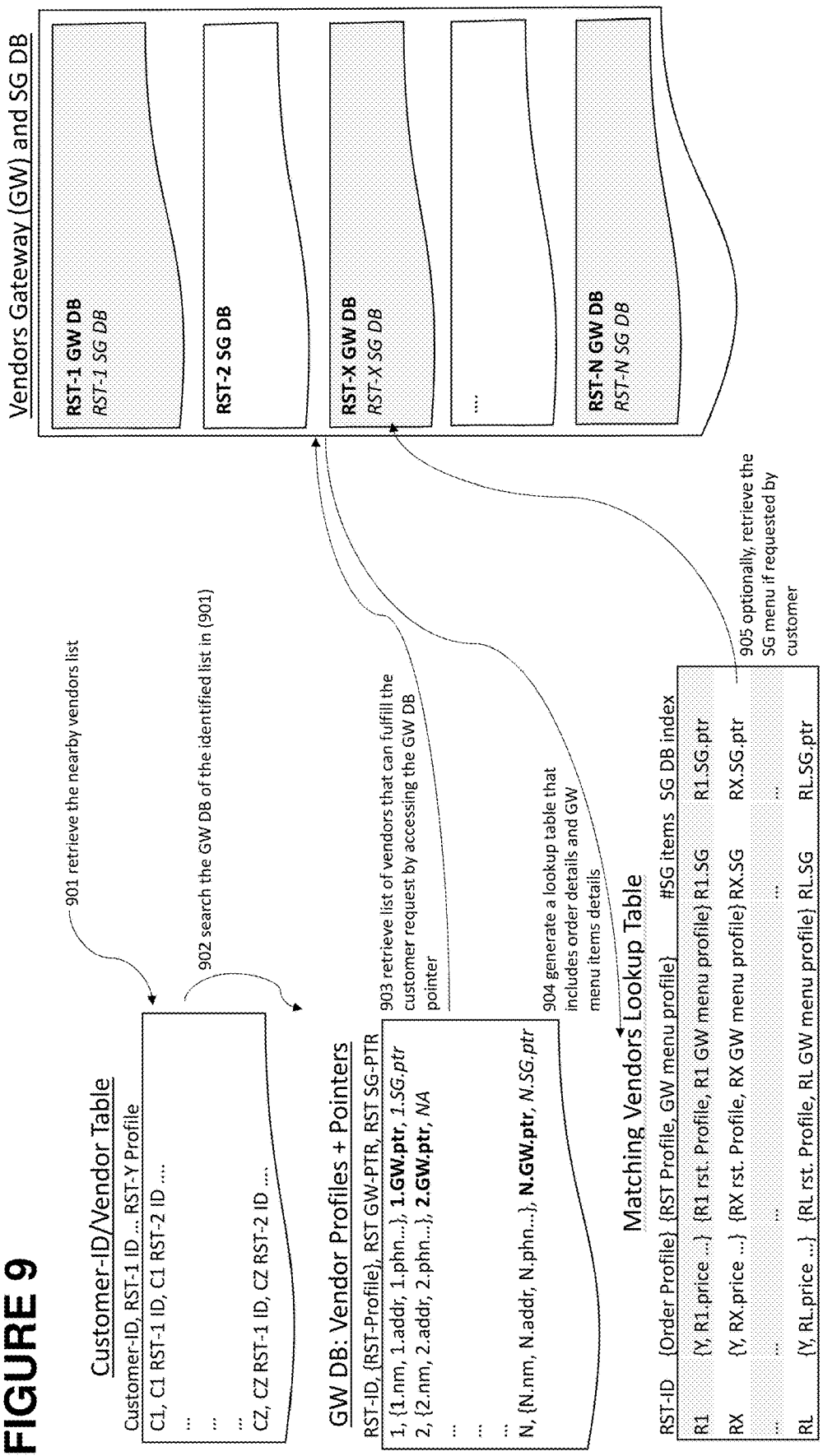
Figure 10:
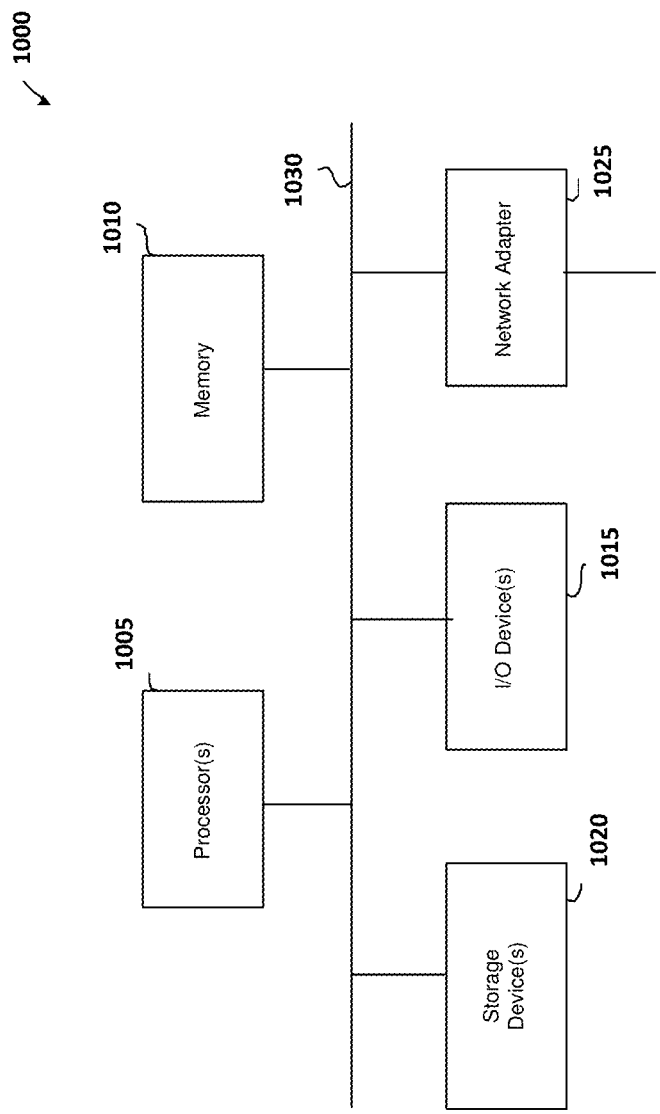

FIG. 4 provides a series of screen shots illustrating the user interface in an embodiment of the invention;

FIG. 5 is a flow diagram illustrating the user interaction in an embodiment of the invention;

FIG. 6 is a block diagram that illustrates a database topology according to the invention;

FIG. 7 illustrates a typical vendor database (SG DB) according to the invention;

FIG. 8 is a block diagram that shows an example implementation of a decoupled menu DB where one DB hosts the Gateway menu items and another DB hosts the full traditional (SG) menu items according to the invention;

FIG. 9 is a block diagram that shows an example implementation of a coupled menu DB where both the Gateway menu items and the full traditional (SG) menu items are stored in one DB according to the invention; and FIG. 10 is a block schematic diagram showing a machine in the example form of a computer system within which a set of instructions for causing the machine to perform one or more of the methodologies discussed herein may be executed.

DESCRIPTION

Figure 1:
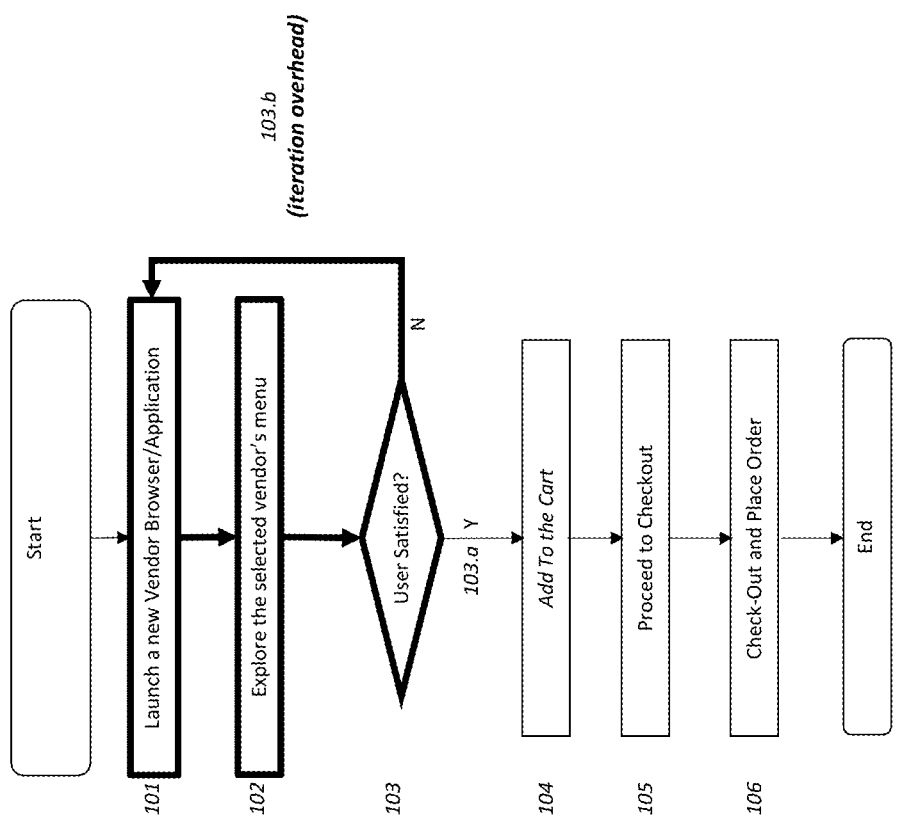
FIG. 1 is an example of a flow diagram illustrating traditional single vendor-dedicated online ordering platform.
Figure 2:
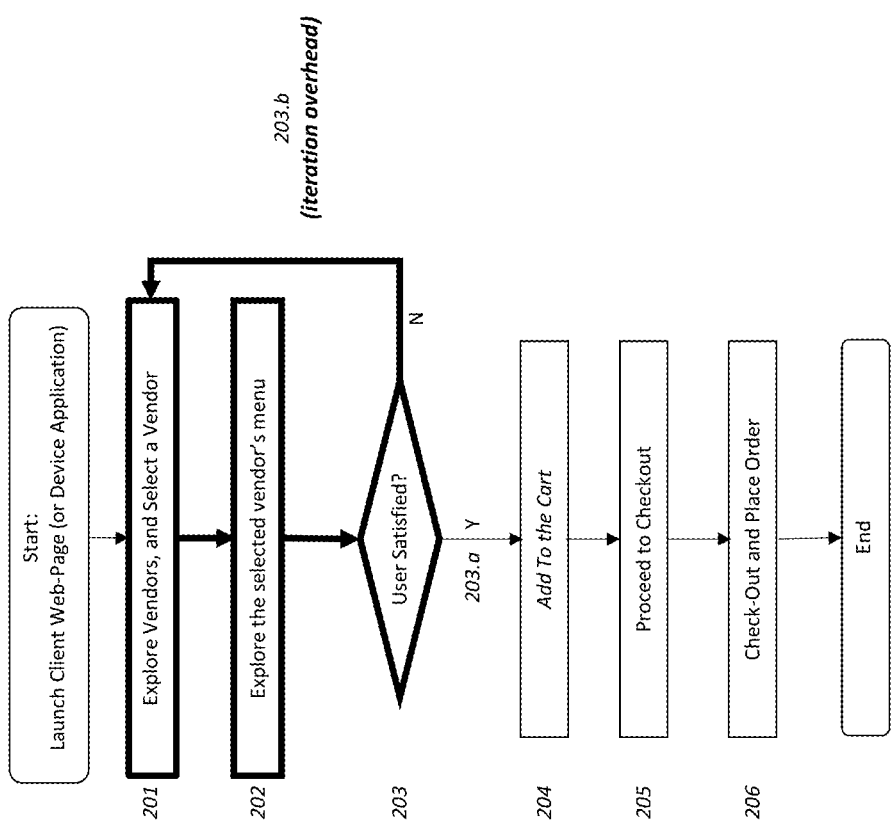
FIG. 2 is an example of a flow diagram illustrating traditional multi-vendor online ordering platform.
Figure 3:
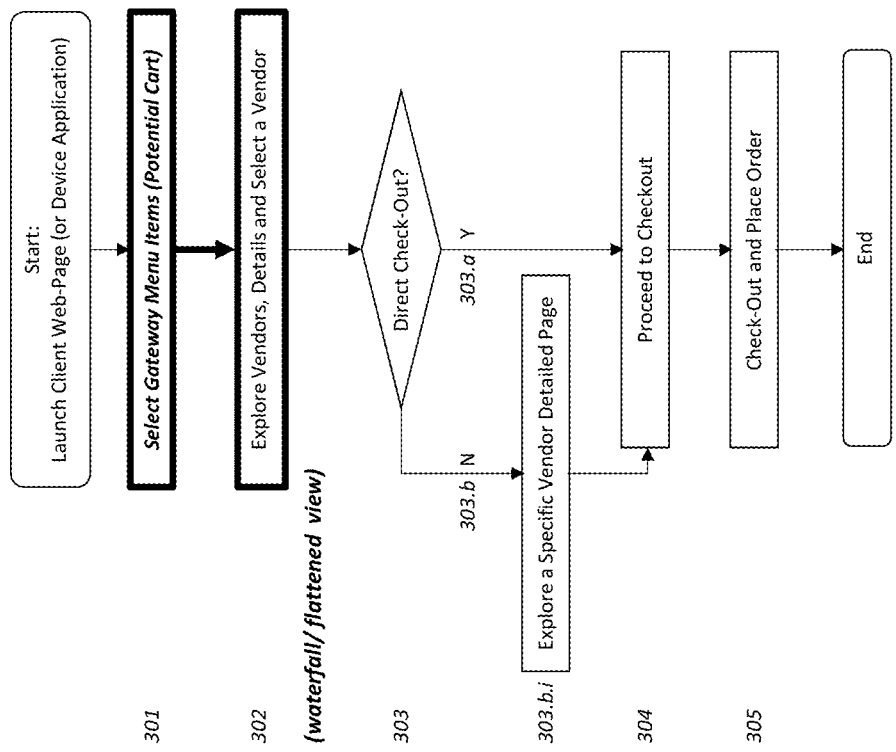
FIG. 3 is a flow diagram illustrating an embodiment of the invention.

An embodiment of the invention provides a waterfall, i.e. non-iterative, method and apparatus for food ordering from a client system (see FIG. 3). Prior to selecting a food vendor (as traditionally performed in FIG. 1 (101) or FIG. 2 (201)), the user can select the desired items from the Gateway menu to create an order (301) and then, with a single query, search among all vendors subscribed to the Gateway menu that can fulfill the order. The Gateway menu items are stored by the server system in a database as a unique data structure, where each item has the same predefined index across all vendors, and where the Gateway menu data base is unified. The server system processes the data structure and retrieves a list of vendors that match the order and, along with vendor-order specific details, e.g. cost, delivery/pickup time, etc., creates an order data structure, which is provided to the user. The user can then explore the order details, e.g. cost, delivery/pickup time, for the retrieved list of vendors in a flattened view (302), i.e. for all vendors that can service the order, thus eliminating the overhead of sequentially iterating through multiple vendors as traditionally performed in the technique of FIGS. 1 and 2 (103.*b*/203.*b*).

Once the user decides which vendor with which to proceed, the user can proceed to checkout directly (304 via 303.*a*) via a checkout page and, by presenting the data structure to the server system, invoke a fulfillment action to place and complete the order (305). If the user wishes to add more items, e.g. drinks, from the vendor-specific menu (303.*b*), the user can proceed to a vendor detailed page first (303.*b.i*), explore options there, and then proceed to checkout (304 via 303.*b*), at which time the system creates a fulfillment action. The fulfillment action is entered into a vendor's workflow, e.g. portal, email . . . etc., and the items in the order are prepared and combined into the order for delivery or pick up by the user accordingly.

In the illustrated embodiment, the client system is provided with a Gateway menu comprising a list of predefined items. The client system displays an indication of actions to be performed by the purchaser to:

1) Select the desired items, size, and quantity the user is considering to purchase, and 2) Specify the address of interest, e.g. user address or GPS location for delivery or a reference address or GPS location for pickup and, 3) Optionally, specify the handing-over method, e.g. delivery or pickup or dine-in.

Such information specified in (1), (2), and (3) above is combined in a data structure that is referred to herein as an order-signature. In response to the indicated actions being performed, the client system sends to the server system the order-signature. The server system uses the order-signature to retrieve vendors that can fulfill this request. Because each Gateway menu item has the same index across all vendors, item details are retrieved directly without the need to perform a search process across the full database. The server system then retrieves the vendor details associated with the placed request including, but not limited to, price, delivery cost, delivery/pickup time, distance, payment method, and contact information. Such vendor-specific information associated to the order-signature can be combined into a further data structure that is referred to herein as the vendor-order-signature.

The server system sends the vendor-order-signature data structure to the client system as a dynamically generated list of vendors matching the user request (order-signature) along with the vendor details associated with that request (vendor-order-signature). The client system receives the vendor-order-signatures and displays the list of the vendors and vendor-order-signatures and an indication of actions to be performed by the user to select a potential vendor and then:

1) Proceed to checkout directly, or

2) Proceed to the selected vendor detailed page, which may include a menu and information page, for possibly more actions, e.g. adding signature items . . . etc., and then proceed to checkout.

Upon finalizing the order details with the selected vendor by the user an order data structure is generated, i.e. upon proceeding to checkout, and the client system displays an indication of actions to be performed by the purchaser to fill the order, and confirms all of the information required to place and fulfill the order, including customer contact information and billing information. The server system receives the order and billing information and generates the order, which is then forwarded to the vendor via a portal, email . . . etc. to fulfill and deliver the order. Other indications of actions can be performed throughout this process. For example, the user may decide to call the vendor instead of completing the order online. In such case, the vendor portal can prompt that a call through this system which can help organizing and keep tracking of the orders.

Thus, embodiment of the invention provides a method and apparatus for ordering food. A predefined list of Gateway items is provided, each of which is assigned with a unique identifier that resides in the same database coordinate across all subscribing vendors. A database stores vendor-specific information that includes basic information including, but not limited to, vendor name, address, phone number, Gateway menu items, detailed menu items, handing-over methods and details, including delivery time area coverage, and payment-method.

A first selection page, e.g. a Gateway menu, is provided to a user comprising a first level selection. A user selection of items is received from among the predefined list of Gateway items. An order-signature comprising a unique identifier is generated for the selection of items. The system directly matches the order-signature with vendors that can fulfill the order-signature. An order page is generated comprising the selection of items and the vendors that fulfill the order-signature. A vendor selection is received from the order page.

If the user wishes to add to or modify his order after selecting a vendor, a second selection page is provided to the user comprising a second level selection from the selected vendor's local/signature menu. The second level selection comprises any of at least one additional item selection and/or item deletion or modification, a service selection, and an order confirmation.

The order-signature, any additional item selections, any service selections, and the order confirmation is received at a vendor order entry system, e.g. portal, email . . . etc. An order is created for the selected vendor in the vendor's order entry system, the order comprising the items in the order-signature, any additional item selections and/or item deletion or modification, and any service selections, and the order is then fulfilled.

In some embodiments, the order can be handled by a third party agent.

FIG. 4 provides a series of screen shots illustrating the user interface in an embodiment of the invention. In screen #1 a user may select Gateway menu items for an order. The system matches the selection to vendors that meet the user's selection criteria (screen #2). The user may select a vendor and go directly to check out (screen #4), or the user may go to a vendor specific screen (screen #3) to visit the signature menu and possibly modify the selection. In screen #1 and #2 the selection is propagated to a virtual cart or wish list cart because the items are selected but a vendor has not yet been selected. In screens #3 and #4, the cart is real cart because the selected items are now linked to a specific vendor.

FIG. 5 illustrates an example of a user interaction in the predefined Gateway menu ordering flow in an embodiment of the invention. When a user submits a potential order-signature (vendor not selected yet) via a client system (401), the order details including desired item(s), address-of-interest and, if-decided, the delivery method are submitted to the server system. The server system determines whether the order-signature can be fulfilled by potential vendors. If so fulfilled, the server system sends the vendor-order-signature, e.g. price, delivery cost, delivery/pickup time, distance, payment method and contact information, via a Web page to the client computer system along with indication of actions to:

1) Proceed to check-out with a specific vendor. or
2) Proceed to the vendor detailed page.

Other indications of actions can be displayed, for example, place a call to a vendor (510), vendor list sort and filtering options (507), etc.

The user can then explore the list of available vendors and the actions can be performed (505). If the user chooses to proceed to check-out directly, e.g. via a single action such as clicking a mouse button, with a specific vendor (509), i.e. the user does not want to add more items, the client system notifies the server system and the selected item(s), e.g. pizza type, size, quantity, are added to the shopping-cart. The server system triggers the client system to complete the information needed for the checkout, for example, fill contact and billing information (515), or retrieve such information from a user profile.

Upon completion, the server generates the order. Thus, once the list of vendors supporting the order-signature is displayed along with the vendor-order-signatures, the user need only take a single action to proceed (bypassing several steps and going to steps 509 to 514 of FIG. 5 directly) to the checkout page in which other details may be filled to complete and place the order, after which the order is provided to the vendor for fulfillment and delivery.

If the user chooses to proceed to a specific vendor detailed page, the already selected-items (501) are automatically added the shopping-cart immediately upon entering the vendor detailed page, or upon proceeding to check-out in that page (513). In the vendor's detailed page (511), the user can modify the order by adding/removing items to/from the potential order specified at step 501 because that same predefined Gateway menu is available for access in the vendor detailed page; or by adding more items to the order from the vendor-specific menu, e.g. the vendor may choose to upload the full menu there and include signature meals and drinks.

Thus, once a page is dynamically generated and displayed showing the list of vendors supporting the order-signature, the user can explore the vendor-specific information (505) (vendor-order-signatures) and, based upon which vendor is selected, the user can proceed with a specific vendor to explore other items, possibly modifying the order, and then proceed to check-out. Once proceeding to the check-out page, the server system triggers the client system to complete the information needed for the checkout, for example, add contact and billing information (515). Upon completion (518), the server generates the order, which is then forwarded to the vendor for fulfillment and delivery.

One skilled in the art will appreciate that the order-signature is a data structure that can be dynamically modified in real time through the process if the purchaser takes some action to modify the order-signature. One skilled in the art will appreciate that some actions can be omitted or rearranged or adapted in various ways. One skilled in the art will appreciate that the flow may support going back and forth between various steps and updating/modifying the cart accordingly.

If the user wishes to specify only the address/location in (501), i.e. the user does not specify the desired items to be ordered, then the server retrieves all vendors fulfilling the address requirement. The user can then select and explore vendors as performed in the traditional technique illustrated in FIG. 2. Hence, the system is flexible and can work in both the inventive bypassing method, where the user goes directly from the Gateway menu to place the order with a selected vendor, and traditional methods that do not include a Gateway menu and that require the user to visit each vendor.

Embodiments of the invention display a form of Web page (or user application) contents providing a list of items that the user may choose from for a potential order and other actions to perform, i.e. see FIG. 4. This example Web page may have been sent from the server system to the client system, updated by the server system, or preloaded on the client system at the time of installation. This example Web page displays a list of predefined Gateway menu items along with fields to fill an address and, optionally, the desired handing-over method.

If the purchaser wants to verify the address-of-interest, the purchaser can select the address field. In response to this selection, the server system may require the purchaser to select from an address history, use the GPS location feature, or fill the address manually. One skilled in the art will appreciate that these various sections can be reorganized or adapted in various ways, for example, an item can be selected by entering a unique code specific to that item. Such feature can be omitted or rearranged or adapted in various ways.

Upon item selection, information that identifies and describes the item can be displayed. This item information section displays a brief or detailed information so that the purchaser can determine the item among the other listed items. Detailed information about the selected items can be added by vendors and displayed later in the vendor-detailed page or throughout the process. One skilled in the art will appreciate that these item details can be omitted or rearranged or adapted in various ways. In general, the purchaser need only be aware of the item or items that are available in the predefined Gateway menu list to be potentially ordered by selecting them and specifying quantity and size, if different sizes are available. One skilled in the art will appreciate that these various details in the first page can be omitted or rearranged or adapted in various ways. When the user submits the order-signature, the client system sends a message to the server system requesting it to match this order-signature with the vendor database.

Once the order-signature is submitted, the server system determines which vendors can service the order. The server system builds a list of those vendors that meet the order and then dynamically generates and sends a Web page to the client system that displays to the list of vendors that match the order-signature, along with the vendor-order specific details. The vendor-list Web page contains the name of each vendor along with the vendor-order-signature that can be used, upon selection, to generate a fulfillment and delivery request for the selected vendor. The client system provides a conventional capability (actions) to select a specific vendor and proceed to checkout directly, or proceed to the vendor detailed page for further possible actions, e.g. add more items. One skilled in the art will appreciate that these details and actions in the vendor-list page can be omitted or rearranged or adapted in various ways.

More details or actions can be added in the vendor list page. For example, a place-a-call action can be added next to each vendor. This page also may support modification of the address and/or handing-over method for the sake of flexibility. Also, a sorting mechanism can be activated to sort by, for example, price, distance, vendor-specific menu items, rating, etc. Furthermore, a filtering mechanism can be activated to allow the user to refine the vendor list and narrow it down. For example, if the user is looking to add iced tea to the order, it is be easier to filter for all vendors for which their detailed menu includes iced tea and avoid displaying those that do not have iced tea on their menu. One skilled in the art will appreciate that some information and/or actions can be omitted or rearranged or adapted in various ways.

In embodiments of the invention, a vendor detailed page allows the user to explore more information about that specific vendor such as, but not limited to, detailed address, contact information, opening hours, etc. The client system also provides conventional capability to dynamically modify the shopping cart in real time by modifying the existing order or adding new items from the vendor's supported menus. Further actions and details can be displayed, such as call a vendor, view cart, sub-total, proceed to checkout, and select an order upgrade or special offer. One skilled in the art will appreciate that these details and actions in the vendor-detailed page can be omitted or rearranged or adapted in various ways. Furthermore, more details or actions can be added in the vendor-detailed page. One skilled in the art will appreciate that these details and actions in the vendor-detailed page can be omitted or rearranged or adapted in various ways. Furthermore, more details or actions can be added in the vendor-detailed page.

In embodiments of the invention, a checkout page can display a summary of the order details such as price, tax, deliver-cost, and total cost. The client system provides the conventional capability to review/modify the existing order, review/modify the delivery method, review and complete more information such as, but not limited to, billing information, personal information, tip, to enable the place-order action. One skilled in the art will appreciate that these details and actions in the checkout page can be omitted, rearranged, or adapted in various ways.

When the user clicks on the place-order button, the client system sends a message to the server system requesting to place the order. After the server system processes the message, the server system provides to the client system a new Web page that confirms receipt of the order. Alternatively, the confirming page can be identical to the checkout page, except that the place-order ordering button is replaced with a message confirming the order. One skilled in the art will appreciate that these details can be omitted or rearranged or adapted in various ways, furthermore, more details or actions can be added in the checkout page.

One skilled in the art will appreciate that the predefined Gateway menu shopping model can be used in different environments such as, but not limited to, the Internet, voice-ordering, e.g. phone, voice-recognition, etc. Also, such model can be implemented in different hardware and software environments. For example, the client system can run on a Web browser, a mobile application, a television or audio application, etc. One skilled in the art will appreciate that the invention can be implemented in various embodiments. For example, the Gateway menu items can be identified manually, or via smart algorithms, etc. Further, an Artificial Intelligence (AI)-implemented subscription or reminder module may be included to place orders automatically on a recurring basis, or to track frequent purchases of similar items by a particular individual or group of individuals. One skilled in the art will appreciate that this invention can be targeting other food items (not only pizza) to be predefined and listed in the Gateway menu home page.

FIG. 6 is a block diagram that illustrates an example of a database topology according to the invention. A Gateway Menu (GW) database (601) comprises a central global database that hosts vendors profiles and the Gateway menu items. Each row hosts the vendor ID, vendor profile, e.g. name, address, phone number . . . etc. and the predefined Gateway menu items profiles, e.g. price, size, picture of each item . . . etc. Vendors can subscribe to this menu fully or partially via an Action (602). Based on vendor ID, a pointer to each vendor signature menu database is generated (SG DB).

An action is taken to subscribe to the Gateway menu (602). Vendors can login and subscribe to the Gateway menu by specifying the price of each item and other details. Other forms of subscription, such as profiling and AI can be performed.

A pointer (603) links each vendor in the Gateway DB to its specific (SG) database. SG database is a database that hosts a vendor's full menu.

An SG database (604; see FIG. 7) hosts the traditional menu items of each vendor, e.g. signature items, drinks . . . etc. For example, vendor RST-1 has J-number of items which is specific to this vendor. Vendor RST-2 in this example may have zero number of items as it wished only to support the Gateway menu items. While vendor RST-N has K-number of items. Those skilled in the art will appreciate that this topology is subject to change and that the topology can be re-arranged and/or re-organized to achieve a desired performance. For example, GW menu item details can be fully listed in the Gateway DB, or pointers to these items in the SG DB are listed in the Gateway DB instead.

FIG. 7 illustrates a typical vendor signature database (SG DB), although vendor signature databases can vary from vendor to vendor. The SG DB can include, in addition to the vendor general information (if needed), the full menu database.

The topology illustrated in FIG. 6 can be implemented in different ways. FIGS. 8 and 9 provide two examples.

FIG. 8 is a block diagram that shows a decoupled menu DB where one DB hosts the Gateway DB, which includes vendors profiles and the GW menu items, and another DB hosts the full traditional (SG) menu items according to the invention. In this example, once a request is submitted the Customer-ID/Vendor table is scanned to identify the matching vendors addresses (801). Once this list is identified, the Gateway DB is scanned based on the identified vendor IDs (802), to retrieve the list of vendors that can fulfill the customer request. A data structure Matching Vendors Lookup Table is generated (803). In addition to the vendor-order-signature details, this table also stores the GW DB for each vendor, so user can modify the order without revisiting steps (801) and (802). If a customer wishes to explore a specific vendor SG menu, it can be retrieved from the vendor's SG DB table using the vendor's SG DB pointer stored in the GW DB (804). This DB is similar to a multi-vendor online ordering system (see FIGS. 2 and 12). For example, in FIG. 8, step (804) shows an example on requesting retrieving vendor RX signature (SG) menu.

The Customer-ID/Vendor table maps each customer-address-of-interest to the serving vendors in that area. This table can be built and be updated over time. If a customer-address does not have an entry in this table, a full search in the Gateway DB can be performed to identify those vendors, and accordingly update the Customer-ID/Vendor table.

FIG. 9 is a block diagram that shows a coupled menu DB where both the Gateway menu items and the full traditional menu items are stored in one database according to the invention. In this example, once a request is submitted the Customer-ID/Vendor table is scanned to identify the matching vendors addresses (901). Once this list is identified, the Vendor Profiles the Gateway DB is scanned based on the identified IDs (902), in which a pointer to the GW menu (which has a unified structure across all vendors) of each vendor is accessed to retrieve the to retrieve the list of vendors that can fulfill the customer request (903). A data structure Matching Vendors Lookup Table is generated (904). In addition to the vendor-order-signature details, this table also stores the GW DB for each vendor, so the user can modify the order without revisiting steps (801), (802), and (802). If a customer wishes to explore a specific vendor SG menu, it can be retrieved from the vendor's SG DB table using the vendor's SG DB pointer stored in the GW DB (905). For example, in FIG. 8, step (905) shows an example on requesting retrieving vendor RX signature (SG) menu.

Similar to FIG. 8, the Customer-ID/Vendor table maps each customer-address-of-interest to the serving vendors in that area. This table can be built and be updated over time. If a customer-address does not have an entry in this table, a full search in the Gateway DB can be performed to identify those vendors, and accordingly update the Customer-ID/Vendor table.

Computer Implementation

FIG. 10 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 1000 may include one or more central processing units ("processors") 1005, memory 1010, input/output devices 1015, e.g. keyboard and pointing devices, touch devices, display devices, storage devices 1020, e.g. disk drives, and network adapters 1025, e.g. network interfaces, that are connected to an interconnect 1030.

In FIG. 10, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 1010 and storage devices 1020 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 1010 can be implemented as software and/or firmware to program one or more processors to carry out the actions described above. In some embodiments of the invention, such software or firmware may be initially provided to the processing system 1000 by downloading it from a remote system through the computing system, e.g. via the network adapter 1025.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for ordering food, comprising:
providing a menu database comprising a first database that hosts a gateway database, which includes vendors profiles and gateway menu items, wherein gateway database menu items are stored as a unique data structure, wherein each menu item has the same predefined index across all vendors, and wherein menu item details are retrieved directly without the need to perform a search process across a full database;
providing a second database that hosts a full traditional menu for each vendor;
a customer submitting a request comprising an order to a customer-ID/vendor table, said customer-ID/vendor table mapping each customer-address-of-interest to serving vendors in the customer's area;
scanning said customer-ID/vendor table to identify matching vendors addresses;
after identifying matching vendors addresses, scanning said gateway database based on the identified vendor IDs to retrieve a list of vendors that can fulfill the customer request;
generating a data structure comprising a matching vendors lookup table that stores vendor-order-signature details and that also stores the gateway database for each vendor, wherein the customer can modify the order without again identifying matching vendors addresses and without scanning said gateway database based on the identified vendor Ds;
retrieving a vendor's full traditional menu from the vendor's full traditional menu database using a vendor's full traditional menu database pointer stored in the gateway database when a customer wishes to explore a specific vendor's full traditional menu;
receiving a user vendor selection;
creating an order for the selected vendor in the vendor's order entry system; and
fulfilling said order.

2. The method of claim 1, further comprising:
receiving from an order page a user vendor selection comprising two or more vendors.

3. The method of claim 1, further comprising providing a user interface element for display and user interaction with regard to any of:
available items;
retrieving an item based on a name or an identifier;
information identifying selected items;
an address of interest;
a list of vendors; and
a delivery mode.

4. The method of claim 1, further comprising:
providing a submit order-signature action component that, in response to user selection, sends a request to a server system to retrieve all vendors matching the order-signature.

5. The method of claim 1, further comprising:
providing a virtual shopping cart ordering component that displays an indication of the selected items in the order signature.

6. The method of claim 1, further comprising:
providing a filter component;
providing a proceed to checkout component; and
providing a proceed to vendor component.

7. The method of claim 1, further comprising:
displaying a list of the available vendors along with specific order details for each vendor.

8. The method of claim 6, further comprising:
said filter component filtering vendors based on the vendors' specific menus.

9. The method of claim 6, further comprising:
said proceed to checkout component comprising is a single action that bypasses entering a selected vendor page.

10. The method of claim 1, further comprising:
providing a submit action for proceeding to check out with a specific, selected vendor.

11. The method of claim 1, further comprising:
providing a submit action for proceeding to check out with a specific vendor page.

12. The method of claim 1, further comprising:
automatically fully or partially creating said order-signature upon performing a submit action.

13. The method of claim 1, further comprising:
using unique identifiers to retrieve predefined items.

14. The method of claim 1, further comprising:
displaying vendor-order details in a flattened mode.

15. The method of claim 1, further comprising:
displaying information indicating express ordering to proceed to checkout directly and bypass a vendor detailed page.

16. The method of claim 1, further comprising:
providing an element for the user to select, add, and remove items prior to, and after, selecting a vendor.

17. The method of claim 1, further comprising:
providing a lookup table for matching each vendor to a list of subscribed predefined items.

18. The method of claim 1, further comprising:
the client system notifying the server system when the user chooses to proceed to check-out directly, via a single action, with a specific vendor;
adding said selected items to a shopping-cart;
said server system triggering the client system to complete any information needed for checkout or to retrieve such information from a user profile.

19. The method of claim 18, further comprising:
upon completion, the server generating the order.

20. The method of claim 1, further comprising:
upon displaying a list of vendors supporting the order-signature, along with vendor-order-signatures, the user taking a single action to proceed to a checkout page in which other details are filled to complete and place the order, after which the order is provided to the vendor for fulfillment and delivery.

21. The method of claim 1, further comprising:
when the user chooses to proceed to a specific vendor detailed page, automatically adding the selected-items to a shopping-cart immediately upon entering a vendor detailed page, or upon proceeding to check-out;
wherein the user can modify the order by adding/removing items to/from the potential order in the vendor detailed page.

22. The method of claim 1, further comprising:
once a page is dynamically generated and displayed showing a list of vendors supporting the order-signature, allowing the user to explore vendor-specific information (vendor-order-signatures) and, based upon which vendor is selected, allowing the user to proceed with a specific vendor to explore other items and modify the order, and then proceed to check-out;

upon proceeding to a check-out page, a server system triggering a client system to complete information needed for the checkout; and upon completion, the server generating the order, which is then forwarded to the vendor for fulfillment and delivery.

23. The method of claim 1, further comprising:

dynamically modifying the order-signature in real time when the user takes an action to modify the order-signature.

24. The method of claim 1, further comprising:

when the user selects a place-order button, a client system sending a message to a server system requesting the server system to place the order;

after the server system processes the message, the server system providing to the client system a new Web page that confirms receipt of the order.

* * * * *